3,321,319
METHOD OF FREEZE-DRYING LIQUID DAIRY PRODUCTS
Ulrich Hackenberg, Bensberg, Refrath, and Kurt Kautz, Dahlenberg, Germany, assignors to Leybold Hochvakuum Anlagen G.m.b.H., Cologne-Bayenthal, Germany
No Drawing. Filed Apr. 20, 1964, Ser. No. 361,213
Claims priority, application Germany, Apr. 20, 1963, L 44,685
11 Claims. (Cl. 99—201)

The present invention relates to a process for the preparation of a dry product by the freeze-drying of materials which are capable of being separated into a serum portion and a coagulated residual mass. More particularly, the invention concerns a novel process for the preparation of dry powders from milk and/or other milk products.

Although the general use of freeze-drying methods in the field of foodstuffs and other biological materials is desirable because of quality considerations, nevertheless in many instances the relatively high production costs discourage this. It is known to subject milk and dairy products, for example, yoghurt, to freeze-drying in conventional manner, whereby the crude product, after the freezing step, is dried by sublimation of the ice under vacuum, and thereby there is obtained a satisfactory dried product. The industrial development here has likewise been retarded by reason of the aforementioned economic considerations. One approach might be to carry out a concentration of the material which is capable of being separated into a serum portion and a coagulated residue prior to the freeze-drying process and then, in order to utilize the freeze-drying system more effectively, to subject the concentrate to freeze-drying. This would at the same time yield a dry product, which would, upon solution in water, regain essentially the properties of the concentrate. In this way, in the case of dairy products, there is accomplished a reduction of the swelling power which results from the thickening and the rise in salt concentration when the material has been previously subjected to the freeze-drying step. Nevertheless, the desired objectives are not achieved despite the improvement in the economy of the freeze-drying step through the prior thermo-concentration of the starting material, and moreover, in many instances, those products intended for condensed milk exhibit typical undesirable alterations in taste.

A principal object of the invention is the improvement of the freeze-drying of materials which are capable of separation into an aqueous serum portion and a coagulated residue, particularly milk and/or other dairy products. The essential feature of the invention comprises a method wherein a dairy product, such as milk, is separated into a serum or skim portion and a coagulated residue by mechanical means. Then the coagulated residue, preferably immediately following its separation, is subjected to cooling and then is subjected to a freeze-drying step in accordance with conventional methods. The serum constituent is dried in its separated state, employing known drying methods. Thereafter the products of both drying steps are mixed together to form the final dried product.

Proceeding in the above manner greatly improves the economics of the freeze-drying process, while at the same time the relatively non-sensitive serum portion can be subjected to a comparatively cheap drying operation, such as, for example, vacuum drying. In the mechanical separation of the aqueous serum portion and the coagulated residue, those salts and sugar constituents which would have an adverse effect if the entire mass had been pre-concenerated in a single step, remain in the aqueous serum portion, and thereby the coagulate provides an especially suitable starting material for subsequent freeze-drying. The separation of the serum portion and the residue can be carried out mechanically in a variety of ways, either by centrifuging, sieving, or settling of the solution.

A special advantage of the process is that the various serum portions can be first concentrated through vacuum evaporation and finally be subjected either to a drying from the liquid phase or to freeze-drying. In accordance with another aspect of the invention, it is possible to proceed so that only one portion of the starting material is mechanically separated, and the other part is treated independently or together with the coagulated residue of the first part in a freeze-drying step.

The application of the process of the invention is not limited to milk and dairy products. It can also be applied to many other starting materials which are capable of separation without injury to an aqueous portion and a curd-like or pasty residue. Moreover, there can be treated by the method of the invention materials which comprise a mixture of materials in suspension, which can be concentrated by mechanical separation to a coherent or lumpy residue, whereupon the solution retains only the genuinely dissolved constituents.

When employing milk and/or dairy products as starting materials, the coagulation and the concurrent formation of their residue can be advantageously performed by means of acidification with acid bacteria in known manner. Alternatively, there can be employed the so-called "sweet" coagulation by bacteria or enzyme addition. In various applications, for example, the preparation of a yoghurt or yoghurt-curd powder, it is desirable to carry out the coagulaton by acidification and enzyme addition in accordance with known methods. In such case it is advantageous to treat a portion of the yoghurt with enzymes and then to separate the coagulated residue from the milk serum mechanically whereby the protein materials remaining in the residue are added to the unaltered portion of the yoghurt and are freeze-dried. By the mixing of the relatively dry residue with a portion of the starting material in its original condition there results a curd-like mixed product which develops especially favorable properties when subjected to freeze-drying.

In many cases, particularly when processing dairy products, it is necessary to cool the coagulated residue immediately following separation, in order to avoid hardening thereof. In general, the cooling can be extended down to a temperature of $+4°$ C.

In accordance with a further aspect of the invention, particular starting materials can be separated into more than two portions by mechanical means, which then dried separately, applying freeze-drying only to the sensitive portions, to yield several dry powders in an economical way. To the extent that individual ingredients appear in coherent or lump form after freeze-drying, it is desirable to subject these to mechanical comminution in order to provide a pulverulent mixture.

The following examples illustrate the practice of the invention but are not to be regarded as limiting.

*Example I*

5000 liters of skim milk-yoghurt are separated by centrifuging into 1000 kg. of coagulated protein having about 20% dry weight, and 4000 liters of milk serum having a dry weight content of 6%. The milk protein in the form of a coagulated residue, immediately following the separation, is cooled in a plate cooler to $+6°$ C. and then subjected to freeze-drying. The drying is carried out at 0.8 mm. Hg to a residual moisture of 2%, and there is thus obtained 200 kg. dry product, which can be mechanically pulverized if desired. The 4000 liters of milk serum are evaporated to 500 liters in a vacuum evaporator and finally spray-dried. The initial air temperature is 150° C. and the exit temperature is 70° C. There is obtained a yield of 250 kg. of dry substance in powder form.

Thereupon the products of both drying steps are admixed and there are obtained 450 kg. of yoghurt powder. When 100 grams of the product are made up to 1 liter with cold water, there is obtained 1 liter of full-strength yoghurt, the biological and gustatory properties of which correspond to those of the starting product.

*Example II*

5000 liters of cream having a fat content of 15% are treated with rennet in a ratio of 1:100,000 at 32° C. and mixed with 250 liters of pure acid culture. The temperature is maintained constant for five hours and the coagulate is mechanically separated from the serum by sieving. There are obtained 2000 kg. of a fat-rich coagulate, which is immediately cooled to 4° C. with a plate cooler. The coagulate is then freeze-dried at 0.4 mm. Hg, resulting in a yield of 860 kg. of dry substance. The 3000 liters of serum are concentrated to about 50% solids in a vacuum evaporator and finally subjected to spray-drying as described in Example I. There is obtained a yield of 240 kg. of dry substance. Both dry products are admixed, yielding 1100 kg. of dry product. When 220 grams of this dry product are made up to 1 liter with cold water there is obtained 1 liter of cream-like homogeneous liquid which can be processed and whipped like ordinary cream.

*Example III*

5,000 liters of milk with 25–500 liters, preferably 250 liters, of acid culture as generally obtainable in trade and warmed up to 26° C. 25–100 grams, preferably 50 grams, of rennet are then added. The mixture is left for 12–16 hours until an acid ratio of 26, according to Soxhlet-Henkel, is reached. There is thus obtained 830 kg. protein residuals having about 20% dry weight and 4.170 kg. of milk serum having a dry weight content of 5.5%. The protein residuals are separated from the milk serum by means of centrifuging. The further treatment of the protein residuals is according to the normal freeze-drying process, while a cheaper process such as spray-drying is applied to the milk serum. Thereupon the products of body drying steps are admixed in a mechanical mixer in the proportions of the starting product.

It will be understood that the above description of the present invention is susceptible to various modifications, changes and adaptations, and the same are intended to be comprehended within the meaning and range of equivalents of the appended claims.

What is claimed is:

1. Process for the preparation of dry products from dairy product starting materials which are capable of separation into an aqueous serum portion and a coagulated residue, comprising the steps of
   (a) converting said dairy product into an aqueous serum portion and a coagulated residue;
   (b) mechanically separating said coagulated residue and serum portion;
   (c) cooling said coagulated residue to about 4° C.;
   (d) freeze-drying said cooled coagulated residue;
   (e) drying said serum portion, and
   (f) admixing the dried serum and residue to form a dry product.

2. The process of claim 1 in which the starting material is milk.

3. The process of claim 1 in which the strating material is cream.

4. The process of claim 1 in which the coagulated residue is cooled immediately upon separation.

5. The process of claim 1 in which the serum portion is dried by vacuum drying.

6. The process of claim 1 in which the serum portion is partially dried by vacuum drying and then completely dried by freeze-drying.

7. The process of claim 1 in which the starting material is first subjected to acid coagulation by acid bacteria.

8. The process of claim 1 in which the starting material is first subjected to coagulation by means of an enzyme.

9. Process for the preparation of a dry product from a dairy material which is capable of separation into an aqueous serum portion and a coagulated residue, comprising the steps of
   (a) dividing the dairy material into two portions;
   (b) converting a first portion into an aqueous serum portion and a coagulated residue;
   (c) separating said first portion mechanically into a coagulated residue and a serum portion;
   (d) freeze-drying said separated coagulated residue;
   (e) freeze-drying said unseparated second portion of the dairy material; and
   (f) admixing said dried residue and dried unseparated second portion to form a dry product.

10. Process for the preparation of a yoghurt-curd powder, comprising the steps of
    (a) treating yoghurt milk with an enzyme to form a coagulated protein residue and a serum portion;
    (b) separating said protein residue from said serum;
    (c) cooling and freeze-drying said protein residue;
    (d) drying said serum portion; and
    (e) admixing said dried serum and protein residue to form a dry yoghurt product 11. The process of claim 10 in which the starting yoghurt milk is divided into two portions, the first portion is treated according to claim 10, the second portion is freeze-dried, and all dried products are admixed to form a dry yoghurt product.

References Cited by the Examiner

UNITED STATES PATENTS

| | | | |
|---|---|---|---|
| 1,937,527 | 12/1933 | Otting | 99—56 |
| 2,835,586 | 5/1958 | Peebles | 99—56 |
| 2,885,788 | 5/1959 | Leviton | 99—201 X |
| 2,966,409 | 12/1960 | Williams et al. | 99—56 |
| 3,080,236 | 3/1963 | Ferguson | 99—56 X |

FOREIGN PATENTS

| | | |
|---|---|---|
| 23,100 | 1904 | Great Britain. |

OTHER REFERENCES

Journal of Dairy Science, vol. 36, No. 6, June 1953, p. 566.

A. LOUIS MONACELL, *Primary Examiner.*

RAYMOND N. JONES, *Examiner.*

S. E. HEYMAN, *Assistant Examiner.*